Patented Nov. 18, 1947

2,431,140

UNITED STATES PATENT OFFICE 2,431,140

DICARBAMATES AND PROCESS OF MAKING THE SAME

Maurice Arthur Thorold Rogers, Blackley, Manchester, England, assignor to Imperial Chemical Industries Limited, a corporation of Great Britain No Drawing. Application April 23, 1940, Serial No. 331,189, which is a division of application Serial No. 288,059, August 2, 1939. Divided and this application August 4, 1945, Serial No. 609,480. In Great Britain August 2, 1938

7 Claims. (Cl. 260—404.5)

This application is a division of my copending application Serial No. 331,189, which in turn is a division of my application Serial No. 288,059, filed August 2, 1939.

(The above applications have matured respectively into U. S. Patents Nos. 2,386,142 and 2,386,141, both dated November 2, 1945.)

The invention in said parent application Serial No. 331,189 relates to the manufacture of new quaternary ammonium compounds which are useful in treating textile materials, especially for the purpose of conferring water-repellent properties thereon.

According to that invention new quaternary ammonium salts are prepared by causing a halogenomethyl compound of the formula $$\begin{array}{c} R\mathrm{-O-CO-N-CH_2-X} \\ | \\ A \\ | \\ R\mathrm{-O-CO-N-CH_2-X} \end{array}$$

wherein R is an aliphatic radical of at least 7 carbon atoms, X is a halogen and A is a divalent organic radical, to react with an aliphatic or heterocyclic tertiary amine.

My instant application deals with the preparation of the initial materials themselves.

As will be seen from the above formula, the halogenomethyl compounds which are used as starting materials are derivatives of the fatty alcohols ROH. They are, according to this invention, conveniently made by interaction of two molecular proportions of the chloroformic ester of the alcohol ROH with one molecular proportion of a diamine $NH_2$—A—$NH_2$, whereby a dicarbamate of formula $$R\mathrm{-O-CO-NH-A-NH-CO-O-R}$$

is obtained, followed by treatment of the said dicarbamate with formaldehyde (or a polymer thereof) and a hydrogen halide or a substance behaving as such under the conditions of the reaction (e. g. phosgene), or with a product of the interaction of formaldehyde and a hydrogen halide, namely a dihalogeno-dimethyl ether.

As suitable fatty alcohols for making such halogenomethyl compounds there may be mentioned, for example, octyl, decyl, dodecyl, myristyl, cetyl, octadecenyl, octadecyl and ceryl alcohols; or mixtures of these and similar alcohols obtained by reduction of the acids of natural fats and oils, e. g., coconut oil, palm kernel oil or wool fat, alcohols obtainable by reduction of the esters of montanic acid; or alcohols obtainable by hydrolysis of the mixed sulphuric esters which are formed by sulphonation of polymerized lower olefines; or again alcohols which are simultaneously esters as, for example, β-hydroxyethyl stearate.

Thus, as suitable halogenomethyl compounds obtainable according to the process of this invention there may be mentioned, for example, Di-octadecyl N:N' - di - (chloromethyl) - ethylene-dicarbamate,
Di-octadecyl N:N' - di - (chloromethyl) - hexamethylene-dicarbamate,
Di-octadecyl N:N' - di - (chloromethyl) - p - phenylene-dicarbamate,
Di-octadecyl N:N' - di - (chloromethyl) - m - phenylene-dicarbamate,
Di-octadecyl N:N' - di - (chloromethyl) - o - phenylene-dicarbamate,
Di-octadecyl N:N' - di - (chloromethyl) - 1:5 - naphthylenedicarbamate,
Di-octadecyl N:N' - di - (chloromethyl) - 2 - methoxy-1:4-phenylenedicarbamate,
Di-octadecyl N:N' - di - (chloromethyl) - 2 - chloro-1:4-phenylenedicarbamate,
Di-octadecyl N:N' - di - (chloromethyl) - 6 - methyl-1:3-phenylenedicarbamate the di-(chloromethyl)-dicarbamates having the formulae respectively $$C_{18}H_{37}\mathrm{-O-CO-N}\underset{\underset{CH_2Cl}{|}}{\text{-}}\!\!\left\langle\ \right\rangle\!\!\text{-S-}\!\!\left\langle\ \right\rangle\!\!\text{-N-CO-O-}C_{18}H_{37} \atop \underset{CH_2Cl}{|}$$

$$C_{18}H_{37}\mathrm{-O-CO-N}\underset{\underset{CH_2Cl}{|}}{\text{-}}\!\!\left\langle\ \right\rangle\!\!\text{-SO-}\!\!\left\langle\ \right\rangle\!\!\text{-N-CO-O-}C_{18}H_{37} \atop \underset{CH_2Cl}{|}$$

and $$C_{18}H_{37}\mathrm{-O-CO-N}\underset{\underset{CH_2Cl}{|}}{\overset{CH_3}{\text{-}\!\!\left\langle\ \right\rangle\!\!\text{-}}}\text{CH}_2\!\!\overset{CH_3}{\left\langle\ \right\rangle}\!\!\text{-N-CO-O-}C_{18}H_{37} \atop \underset{CH_2Cl}{|}$$

and also the corresponding di-(bromomethyl)-dicarbamates and the corresponding di-dodecyl, di-cetyl, and di-montanyl di-(chloromethyl)- and di-(bromomethyl)-dicarbamates. All the above di-(halogenomethyl) - dicarbamates and their analogues may be made by the general method herein described and claimed.

As suitable aliphatic or heterocyclic tertiary amines to be combined with the di-(halogenomethyl)-dicarbamates to produce textile assistants therefrom, there may be mentioned, for example, trimethylamine, triethylamine, N:N'-tetramethylethylenediamine, dimethylcyclohexylamine, diethylcyclohexylamine, N-methylpiperidine, pyridine and α-picoline.

The resulting quaternary salts are white or pale coloured solids which are soluble in water, benzene, alcohol, chloroform and ethylene dichloride and sparingly soluble in ether and acetone. They are useful as textile assistants especially in the field of water-repellency treatments as described more fully in my parent application above referred to.

The invention is illustrated but not limited by the following examples in which the parts are by weight.

*Example 1*

The starting out material for this example is made as follows:

35 parts (i. e. 1/20 mol) of di-octadecyl p-phenylene-dicarbamate of the formula

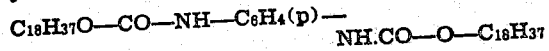

C₁₈H₃₇O—CO—NH—C₆H₄(p)—
NH.CO—O—C₁₈H₃₇

(M. P. 146° C. made by condensing two molecular proportions of octadecyl chloroformate with one molecular proportion of p-phenylenediamine) and 6 parts of paraformaldehyde (i. e. 1/10 mol) are mixed with 500 parts of benzene. The mixture is stirred and heated. The temperature is kept at 60° C. while dry hydrogen chloride is passed in. As the reaction proceeds water separates out and the liquid becomes turbid. Eventually the liquid becomes clear again and the water separates from it and forms a separate layer. The lower aqueous layer is then run to waste. The benzene is distilled off from the upper layer, preferably under sub-atmospheric pressure. The residue left in the still is di-octadecyl N:N'-di-(chloromethyl)-p-phenylenedicarbamate of the formula:

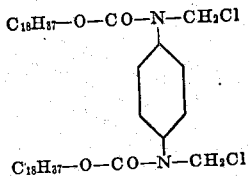

C₁₈H₃₇—O—CO—N—CH₂Cl

C₁₈H₃₇—O—CO—N—CH₂Cl

It is an oil, which on standing at room temperature, or on cooling to below room temperature, solidifies to a white waxy solid which fumes slightly in the air, and which is soluble in the cold in benzene, acetone, ether, ethyl acetate and chloroform.

If the above dichloromethyl compound is mixed in liquid form with 10 parts (i. e. ⅛ mol) of pyridine, there is evolution of heat, and the mixture rapidly sets solid. The solid is di-octadecyl N:N'-di(chloropyridinium-methyl)-p-phenylenedicarbamate and is useful as a water-repellency agent.

In a similar manner, starting in each case with 1 molecular proportion of the corresponding dicarbamic acid dialkyl ester and 2 molecular proportions of formaldehyde and treating the mixture in benzene with hydrogen chloride, there may be made the following di-(chloromethyl)-dicarbamates, namely, di-octadecyl N:N'-di-(chloromethyl)-m-phenylenedicarbamate, di-octadecyl N:N'-di-(chloromethyl)-p-phenylenedicarbamate, di-octadecyl N:N'-di-chloromethyl)-6-methyl-1:3-phenylenedicarbamate, di-octadecyl N:N'-di-(chloromethyl)-2-chloro-1:4-phenylenedicarbamate, di-dodecyl N:N'-di-(chloromethyl)-p-phenylenedicarbamate, di-octadecyl N:N'-di-(chloromethyl)-ethylenedicarbamate, di-octadecyl N:N'-di-(chloromethyl)-hexamethylenedicarbamate, and di-octadecyl N:N'-di-(chloromethyl)-methylenedicarbamate.

*Example 2*

35 parts of di-octadecyl m-phenylenedicarbamate (M. P. 96° C., made by condensing two molecular proportions of octadecyl chloroformate with one molecular proportion of m-phenylenediamine) are converted into the dichloromethyl compound by the method described, in respect of the p-isomer, in Example 1.

The di-octadecyl N:N'-di-(chloromethyl)-m-phenylenedicarbamate so obtained if dissolved in 150 parts of benzene, and treated with triethylamine, gives a bis-quaternary compound useful as a water repellent.

If in this process there are used, instead of the 35 parts of di-octadecyl m-phenylenedicarbamate, 33 parts of di-octadecyl ethylenedicarbamate, there is similarly obtained di-octadecyl N:N'-di-(chloromethyl)-ethylenedicarbamate.

I claim as my invention:

1. As new intermediates for the manufacture of textile assistants, compounds of the general formula

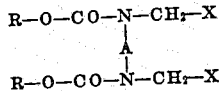

R—O—CO—N—CH₂—X
|
R—O—CO—N—CH₂—X wherein R is an aliphatic radical of at least 7 carbon atoms, X is halogen and A is a divalent hydrocarbon radical.

2. Process for producing organic intermediates which comprises reacting with agents yielding formaldehyde and a hydrogen halide upon a dicarbamic acid ester of the formula

R—O—CO—NH
|
R—O—CO—NH wherein R is an aliphatic radical of at least 7 carbon atoms, while A is a divalent hydrocarbon radical.

3. As new intermediates for the manufacture of textile assistants, compounds of the general formula

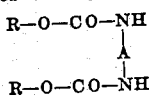

R—O—CO—NH
|
R—O—CO—NH wherein R is an aliphatic radical of at least 7 carbon atoms, while A is a divalent hydrocarbon radical.

4. Process for producing organic intermediates which comprises condensing one molecule of an organic diamine selected from the group consisting of aliphatic and aromatic diamines with two molecules of a halogen-formic-acid ester of the formula R—O—CO—X, wherein R is an aliphatic radical of at least 7 carbon atoms, while X stands for halogen, to form the corresponding diamide.

5. A process for producing organic compounds useful as intermediates for water-repellency agents, which comprises condensing two moles of a halogen-formic acid ester of an aliphatic alcohol with one mole of an organic diamine selected from the group consisting of aliphatic and aromatic diamines to give a diamide compound of the general formula

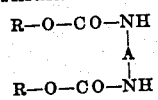

R—O—CO—NH
|
R—O—CO—NH wherein R is an aliphatic radical of at least 7 carbon atoms, while A is a divalent organic radical corresponding to the organic diamine selected; then reacting upon said diamide with agents yielding formaldehyde and a hydrogen halide, to produce di-(halogen-methyl) compound of the general formula

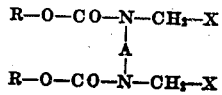

wherein R and A have the same significance as above, while X stands for halogen.

6. Di - octadecyl - N:N' - di(chloromethyl) - p-phenylene-dicarbamate, the same being a waxy solid which fumes slightly in air and which is soluble in benzene, acetone, ether, ethyl acetate and chloroform.

7. Di - octadecyl - p - phenylene - dicarbamate.

MAURICE ARTHUR THOROLD ROGERS.

REFERENCES CITED

The following references are of record in the file of this patent:

UNITED STATES PATENTS

| Number | Name | Date |
|---|---|---|
| 2,132,388 | Berchet | Oct. 11, 1938 |
| 2,139,679 | Hardy | Dec. 13, 1938 |
| 2,109,941 | D'Alelio | Mar. 1, 1938 |

FOREIGN PATENTS

| Number | Country | Date |
|---|---|---|
| 537,221 | Great Britain | June 13, 1941 |